US008066319B2

(12) United States Patent
Hafften et al.

(10) Patent No.: US 8,066,319 B2
(45) Date of Patent: Nov. 29, 2011

(54) VEHICLE EMERGENCY EGRESS ASSEMBLY

(75) Inventors: Michael L. Hafften, Loretto, MN (US); Thomas G. Buckner, Gibsonia, PA (US)

(73) Assignee: BAE Systems Land & Armaments, L.P., Santa Clara, CA (US)

(*) Notice: Subject to any disclaimer, the term of this patent is extended or adjusted under 35 U.S.C. 154(b) by 681 days.

(21) Appl. No.: 11/939,862

(22) Filed: Nov. 14, 2007

(65) Prior Publication Data

US 2011/0260495 A1 Oct. 27, 2011

Related U.S. Application Data

(60) Provisional application No. 60/872,386, filed on Dec. 1, 2006, provisional application No. 60/919,748, filed on Mar. 23, 2007.

(51) Int. Cl.
*B60J 5/00* (2006.01)

(52) U.S. Cl. .................................................... 296/146.1

(58) Field of Classification Search ............... 296/146.1, 296/187.01, 187.03, 96.21, 146.2, 201, 146.15; 70/192, 201, 202; 52/783.1, 786.1, 786.11
See application file for complete search history.

(56) References Cited

U.S. PATENT DOCUMENTS

| | | | | | |
|---|---|---|---|---|---|
| 1,632,360 | A | * | 6/1927 | Wilson | 296/24.37 |
| 2,273,971 | A | * | 2/1942 | Love | 109/11 |
| 3,397,005 | A | * | 8/1968 | May et al. | 296/24.46 |
| 3,671,370 | A | | 6/1972 | Littell, Jr. | |
| 3,739,527 | A | | 6/1973 | Schubach | |
| 3,923,339 | A | * | 12/1975 | McDonald | 296/95.1 |
| 4,005,662 | A | * | 2/1977 | Kohn et al. | 109/16 |
| 4,167,889 | A | * | 9/1979 | Bohne et al. | 89/36.02 |
| 4,316,404 | A | * | 2/1982 | Medlin | 89/36.08 |
| 4,333,282 | A | * | 6/1982 | Medlin | 52/172 |
| 4,336,644 | A | * | 6/1982 | Medlin | 29/401.1 |
| 4,351,558 | A | * | 9/1982 | Mueller | 296/203.01 |
| 4,352,316 | A | * | 10/1982 | Medlin | 89/36.02 |
| 4,489,639 | A | * | 12/1984 | Winkler et al. | 89/37.01 |
| 4,495,852 | A | * | 1/1985 | Winkler et al. | 89/46 |
| H000129 | H | * | 9/1986 | Hansen | 89/36.04 |
| 4,625,659 | A | * | 12/1986 | Saelzer | 109/49.5 |
| 4,635,396 | A | | 1/1987 | Ranz et al. | |
| 5,070,764 | A | * | 12/1991 | Shevach et al. | 89/36.17 |
| 5,169,205 | A | | 12/1992 | James | |
| 5,438,908 | A | * | 8/1995 | Madden, Jr. | 89/36.08 |
| 5,474,352 | A | * | 12/1995 | Davies | 296/24.3 |
| 5,487,323 | A | * | 1/1996 | Madden, Jr. | 89/36.08 |
| H001519 | H | * | 3/1996 | Semple | 89/36.02 |
| 5,533,778 | A | * | 7/1996 | Sheridan | 296/152 |
| H001567 | H | * | 8/1996 | Parsons et al. | 89/36.02 |
| 5,594,193 | A | * | 1/1997 | Sheridan | 89/36.08 |
| 5,663,520 | A | * | 9/1997 | Ladika et al. | 296/187.07 |
| 5,679,918 | A | * | 10/1997 | Korpi et al. | 89/36.08 |
| 5,738,403 | A | * | 4/1998 | Tyson | 296/136.02 |
| 5,792,974 | A | * | 8/1998 | Daqis et al. | 89/36.02 |

(Continued)

*Primary Examiner* — Kiran B. Patel
(74) *Attorney, Agent, or Firm* — Patterson Thuente Christensen Pedersen, P.A.

(57) ABSTRACT

A vehicle emergency egress system includes a transparent armor assembly disposable in a vehicle window frame, the transparent armor assembly including at least one transparent armor pane, and interiorly accessible release means, the release means being selectively operable by a vehicle occupant for effecting release of at least the one of the transparent armor panes, such release permitting shifting a respective one of the at least one transparent armor panes from the transparent armor assembly to define an egress portal. A method of forming a vehicle emergency egress system is further included.

5 Claims, 20 Drawing Sheets

U.S. PATENT DOCUMENTS

| | | | | |
|---|---|---|---|---|
| 5,811,719 | A * | 9/1998 | Madden, Jr. | 296/146.7 |
| 5,857,730 | A * | 1/1999 | Korpi et al. | 296/146.1 |
| 5,939,658 | A * | 8/1999 | Muller | 89/36.04 |
| 6,164,715 | A | 12/2000 | Mosaner | |
| 6,302,010 | B1 * | 10/2001 | Holler | 296/187.07 |
| 6,327,954 | B1 * | 12/2001 | Medlin | 89/36.08 |
| 6,408,733 | B1 * | 6/2002 | Perciballi | 89/36.02 |
| 6,427,383 | B1 | 8/2002 | Brooks et al. | |
| 6,719,355 | B2 * | 4/2004 | Ornig et al. | 296/146.5 |
| 6,818,268 | B2 * | 11/2004 | Gonzalez | 428/34 |
| 7,029,038 | B2 | 4/2006 | Kobrehel | |
| 7,070,242 | B2 * | 7/2006 | Mears et al. | 297/452.12 |
| 7,191,694 | B1 * | 3/2007 | Gonzalez | 89/36.02 |
| 7,225,718 | B1 * | 6/2007 | Grove et al. | 89/36.09 |
| 7,232,181 | B2 * | 6/2007 | Schmucker | 296/201 |
| 7,254,927 | B1 | 8/2007 | Farrar et al. | |
| 7,458,306 | B2 * | 12/2008 | Singh et al. | 89/36.02 |
| 7,493,844 | B2 * | 2/2009 | Martin | 89/36.07 |
| 7,549,366 | B2 * | 6/2009 | Park et al. | 89/36.02 |
| 7,695,053 | B1 * | 4/2010 | Boczek et al. | 296/187.12 |
| 2002/0058450 | A1 * | 5/2002 | Yeshurun et al. | 442/59 |
| 2003/0190439 | A1 * | 10/2003 | Gonzalez | 428/34 |
| 2003/0221547 | A1 * | 12/2003 | Peretz | 89/36.02 |
| 2004/0075283 | A1 | 4/2004 | Kobrehel | |
| 2006/0175866 | A1 | 8/2006 | Dankert et al. | |
| 2006/0288856 | A1 * | 12/2006 | Labock | 89/36.04 |
| 2010/0024633 | A1 * | 2/2010 | Piscitelli | 89/36.02 |
| 2010/0071537 | A1 * | 3/2010 | Weber et al. | 89/36.02 |

* cited by examiner

VEHICLE EMERGENCY EGRESS ASSEMBLY

RELATED APPLICATION

The present application claims the benefit of U.S. Provisional Application No. 60/872,386 filed Dec. 1, 2006, and U.S. Provisional Application No. 60/919,748 filed Mar. 23, 2007, which are incorporated herein in their entirety by reference.

FIELD OF THE INVENTION

The present invention relates to an emergency egress window of an armored vehicle, and specifically an interior egress system for occupants to rapidly remove an armored window from the frame of an armored vehicle.

BACKGROUND OF THE INVENTION

Insurgent attacks on U.S. troops supporting ongoing operations for the Global War On Terrorism (GWOT) in Iraq and Afghanistan have exposed vulnerabilities of the ground vehicles used by our troops. Consequently, the HMMWV (commonly known as HumVee) and other light tactical military vehicles, including the Light Utility Vehicle testbed by MillenWorks, are being up-armored to counter the insurgent threats and provide an increased level of soldier protection. A new issue results in that the additional weight of the armor and associated upward shift in center of gravity (CG) has caused these vehicles to become increasingly unstable and difficult for the troops to control. Numerous rollover accidents have and continue to occur given the tendency of these vehicles to go out of control and tip during evasive maneuvering, off-road travel and IED/RPG attack. When an up-armored vehicle rolls over, many times the crew cannot egress via the doors due to the weight of the armor on the doors, or jamming of doors from the vehicle frame twisting. The gunner's station is not an option for exit either if the vehicle is up-side-down. The result is that the crew is often killed due to vehicle fires, follow-up insurgent attacks, trauma injuries and drowning. Therefore there is a need for an emergency egress system for the up-armored vehicles.

A number of prior art examples exist with regards to emergency egress systems for vehicles. U.S. Pat. No. 3,739,527, issued Jun. 19, 1973, entitled KNOCKOUT WINDOW FOR VEHICLE, discloses a knockout window for a vehicle, such as a bus or mass transit car, U.S. Pat. No. 4,635,396, issued Jan. 13, 1987, entitled BUS WINDOW RELEASE MECHANISM, discloses a release mechanism for a vehicle, and U.S. Pat. No. 6,164,715, issued Dec. 26, 2000, entitled EMERGENCY EXIT WINDOW OF A VEHICLE WITH A WINDOW PANEL, discloses an emergency exit window of a vehicle. However, these prior art examples involve mechanisms that are incompatible with the transparent armor assembly required by military vehicles. The egress architecture must provide the crew the required level of blast protection while still meeting the unique interface and support structure requirements for the transparent armor assembly.

A standard (prior art) M1114 window armor assembly 8 is illustrated in prior art FIGS. 1 and 2. Window frame 10 provides the supporting structure for a window armor frame 12 and the two pieces of transparent armor (ballistic glass) 14. Window frame 10 defines an aperture for window spacer/sill 16 and transparent armor 14. The window armor frame 12 is disposed about the periphery of the transparent armor 14. The window armor frame 12 generally includes six separate armor plates: upper window armor plate 18, center armor plate 20, side armor plates 22 and the lower window armor plate 24. The window armor frame 12 overlies portions of both pieces of transparent armor 14 as at overlap 15, thereby capturing the transparent armor 14 in the frame 10. The individual plates, i.e. upper window armor plate 18, center armor plate 20, side armor plates 22, and lower window armor plate 24 of the window armor frame 12 are fastened by screws or similar type fasteners that extend into the windshield frame 10. The window frame 10 is fitted to the vehicle side armor 19. In an emergency situation, removal of transparent armor 14 is not possible by the occupant as the transparent armor 14 is secured by the window armor frame 12 from the exterior of the vehicle. Someone outside the vehicle would have to remove all of the fasteners of the window armor frame 12 before accessing the transparent armor 14, a time consuming operation that needlessly exposes the person performing the operation under combat conditions.

There is therefore a need for an improved alternate or additional egress capability for up-armored vehicles to address the previously described problem, especially the capability for the vehicle occupants to effect the egress without exterior assistance.

SUMMARY OF INVENTION

The objective of this invention is to provide a manual means for the crew of the vehicle to easily remove the transparent armor assembly for the purpose of exiting the vehicle in emergency situations. Provision of the additional egress option provided by this invention increases the probability of survival for the crew members of up-armored vehicles. This invention provides an alternate means of egress while still maintaining and not compromising the required levels of protection for the crew from small arms fire and exterior blast. It is a goal of this invention to be simple for the vehicle crew to operate in an emergency situation and inexpensive to produce.

An embodiment of this invention is intended to be integrated into up-armored light tactical military vehicles to provide the crew an alternative means of emergency egress as an integral unit without the plurality of armor plates noted above. Such integration can be a retrofit or can be installed at the time of vehicle construction. The focus of this embodiment is the integration of a new function into the ballistic glass (transparent armor) component of these vehicles. As noted, it has been discovered that up-armor of light vehicles have increased the probability of rollover accidents due to changes in vehicle mobility characteristics (principally an elevated center of gravity) resulting from the additional weight of the armor. In the event of a rollover or other accident the crew will typically attempt to exit the vehicle via the doors. For some accident situations the doors may be blocked or jammed and therefore trap the crew inside the vehicle.

This invention provides an option for the crew to exit via the windshield (or other windows) in these situations. Conceptually, this invention provides a crew actuated mechanism that releases the transparent armor assembly from the frame structure of the vehicle. In the event of a rollover or other accident that may render the doors of the vehicle unusable, a crew member can actuate a simple, manually operated release mechanism from the interior of the vehicle. Upon actuation and release the crew member can manually push to remove and eject the windshield transparent armor assembly to the exterior of the vehicle. The resulting portal of the vehicle window frame structure provides the crew with an emergency egress option.

In another embodiment, the implementation of a rotary/slide locking mechanism is added to the transparent armor assembly. This mechanism integrates with the glass assembly frame. This mechanism provides a slide bar, sash lock, cam action or other variant approach to hold the transparent armor assembly to the vehicle window frame. In addition, the flange of the glass assembly frame supports the transparent armor assembly from the vehicle exterior via the interface with the vehicle window frame. The lock mechanism will provide support from the opposite side of the vehicle frame structure (interior to the vehicle) and secure the transparent armor assembly in place. An installation may require two or more lock mechanisms to be integrated with the frame. The lock mechanism can be released directly by the crew and requires no tools. Upon release the transparent armor assembly becomes unsecured and can be pushed out by the crew.

In another embodiment, the invention uses removable gasket material as the means to lock and disengage the transparent armor assembly. A fastener bracket is secured to the vehicle window frame structure (outer fastener bracket). This fastener bracket follows the perimeter of the frame opening and provides a lip to interface with one side of the gasket material. A modified glass assembly frame provides a second lip (inner fastener bracket) that is intended to interface with the opposing side of the gasket material. The flange of the glass assembly frame supports the transparent armor assembly from the exterior via the interface with the vehicle window frame. The gasket is fabricated from molded rubber or other similar compliant material. The gasket provides the mechanism to support from the opposite side of the vehicle frame structure (interior to the vehicle) and secure the transparent armor assembly in place. The gasket material is a two piece design. One portion of the gasket bridges the gap between the outer fastener bracket on the frame structure and the inner fastener bracket on the glass assembly frame. The second portion, referred to as the lock strip, locks the gasket in place and in turn secures the complete transparent armor assembly to the vehicle. With the lock strip installed the transparent armor assembly is secure and would require a tremendous level of force from the interior side to dislodge the assembly. The gasket lock can be released directly by the crew and requires no tools by removal of the lock strip. A handle may be attached to the lock strip and accessible to the crew for easy removal. Upon removal of the lock strip the transparent armor assembly becomes unsecured and can be pushed out by the crew with minimal force. This design has a benefit over other potential mechanical embodiments in that it is compliant and can reliably accommodate potential changes in vehicle window frame structure geometry that may occur as a result of a vehicle accident (i.e., rollover, IED).

In another embodiment, the implementation of a rotary locking mechanism will be added to the transparent armor assembly. This mechanism integrates with the glass assembly frame. The locking mechanism provides support from the opposite side of the vehicle frame structure (interior to the vehicle) and secure the transparent armor assembly in place. An installation may require two or more lock mechanisms to be integrated with the frame. The lock mechanism can be released directly by the crew and requires no tools. Upon release the transparent armor assembly becomes unsecured and can be pushed out by the crew. This design has a benefit over other potential mechanical embodiments in that it is compliant and can reliably accommodate potential changes in vehicle window frame structure geometry that may occur as a result of a vehicle accident (i.e., rollover, IED).

A feature to be integrated into any these above implementations is a lever arm for removal assist. This lever would interface with the vehicle window frame structure and the transparent armor assembly. This lever would be actuated by the crew following actuation of the primary release mechanism and provide a means to amplify force (pry bar) to assist removal of the transparent armor assembly. A second potential feature would be external removal ability. This feature would allow rescue personnel to remove the windows from the exterior of the vehicle to access crew.

The present invention is a vehicle emergency egress system, including a transparent armor assembly disposable in a vehicle window frame, the transparent armor assembly including at least one transparent armor pane, and interiorly accessible release means, the release means being selectively operable by a vehicle occupant for effecting release of at least the one of the transparent armor panes, such release permitting shifting a respective one of the at least one transparent armor panes from the transparent armor assembly to define an egress portal. The present invention is further a method of forming a vehicle emergency egress system.

The above summary of the various representative embodiments of the invention is not intended to describe each illustrated embodiment or every implementation of the invention. Rather, the embodiments are chosen and described so that others skilled in the art may appreciate and understand the principles and practices of the invention. The figures in the detailed description that follows more particularly exemplify these embodiments.

BRIEF DESCRIPTION OF THE DRAWINGS

The invention may be more completely understood in consideration of the following detailed description of various embodiments of the invention in connection with the accompanying drawings, in which.

Prior Art

Prior Art

DETAILED DESCRIPTION OF THE DRAWINGS

In the following detailed description of the present invention, numerous specific details are set forth in order to provide a thorough understanding of the present invention. However, it will be obvious to one skilled in the art that the present invention may be practiced without these specific details. In other instances, well-known methods, procedures, and components have not been described in detail so as to not unnecessarily obscure aspects of the present invention.

Figure 1:
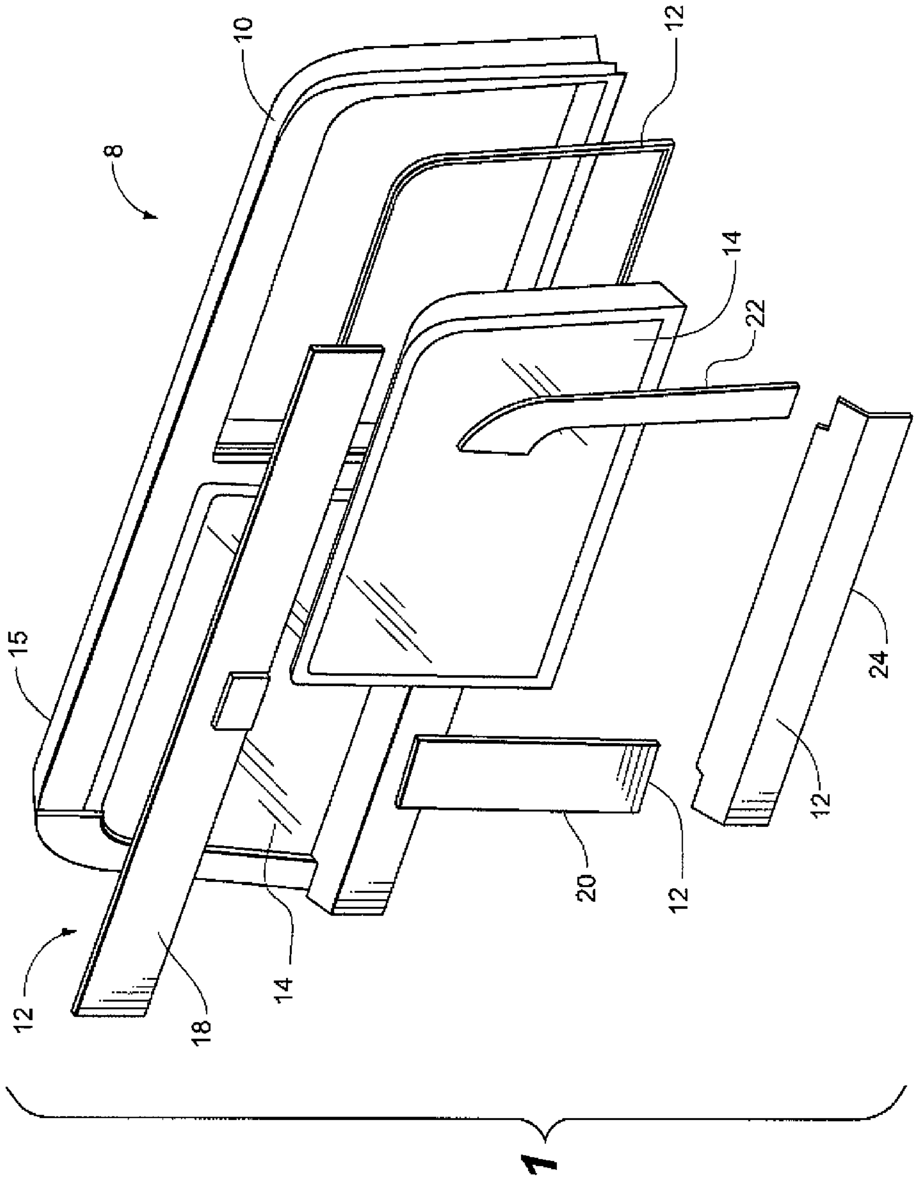
FIG. 1 is an exploded perspective view of a standard M1114 window assembly.
Figure 2:
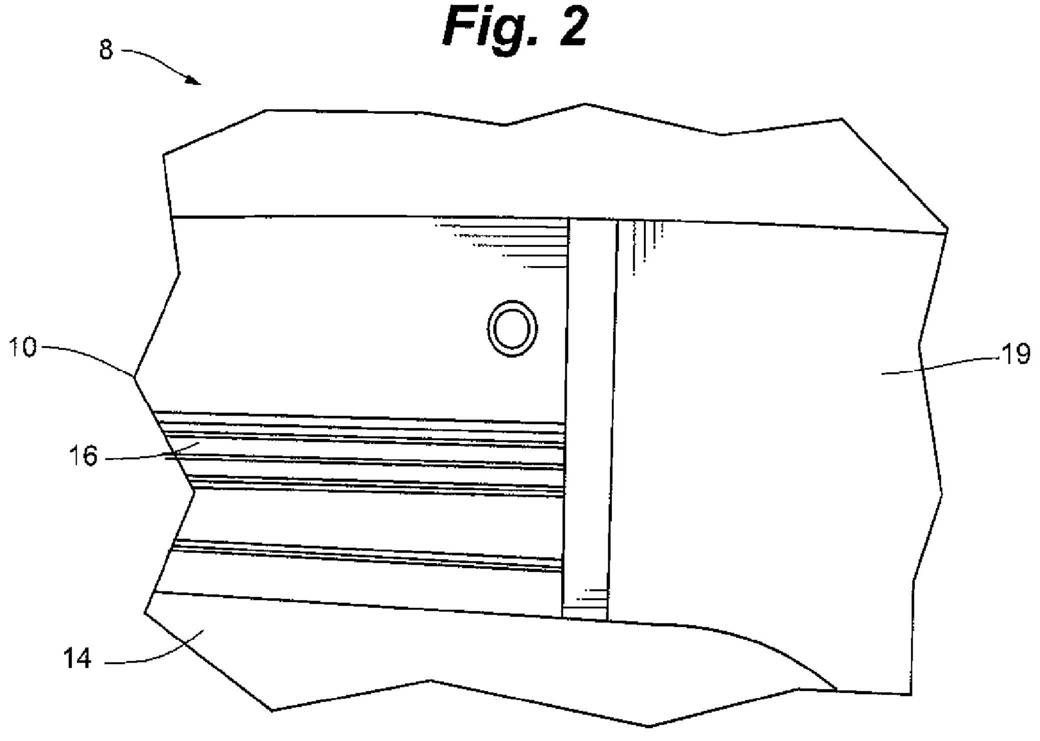
FIG. 2 is a sectional view of a portion of M1114 window assembly of FIG. 1.
Figure 3:
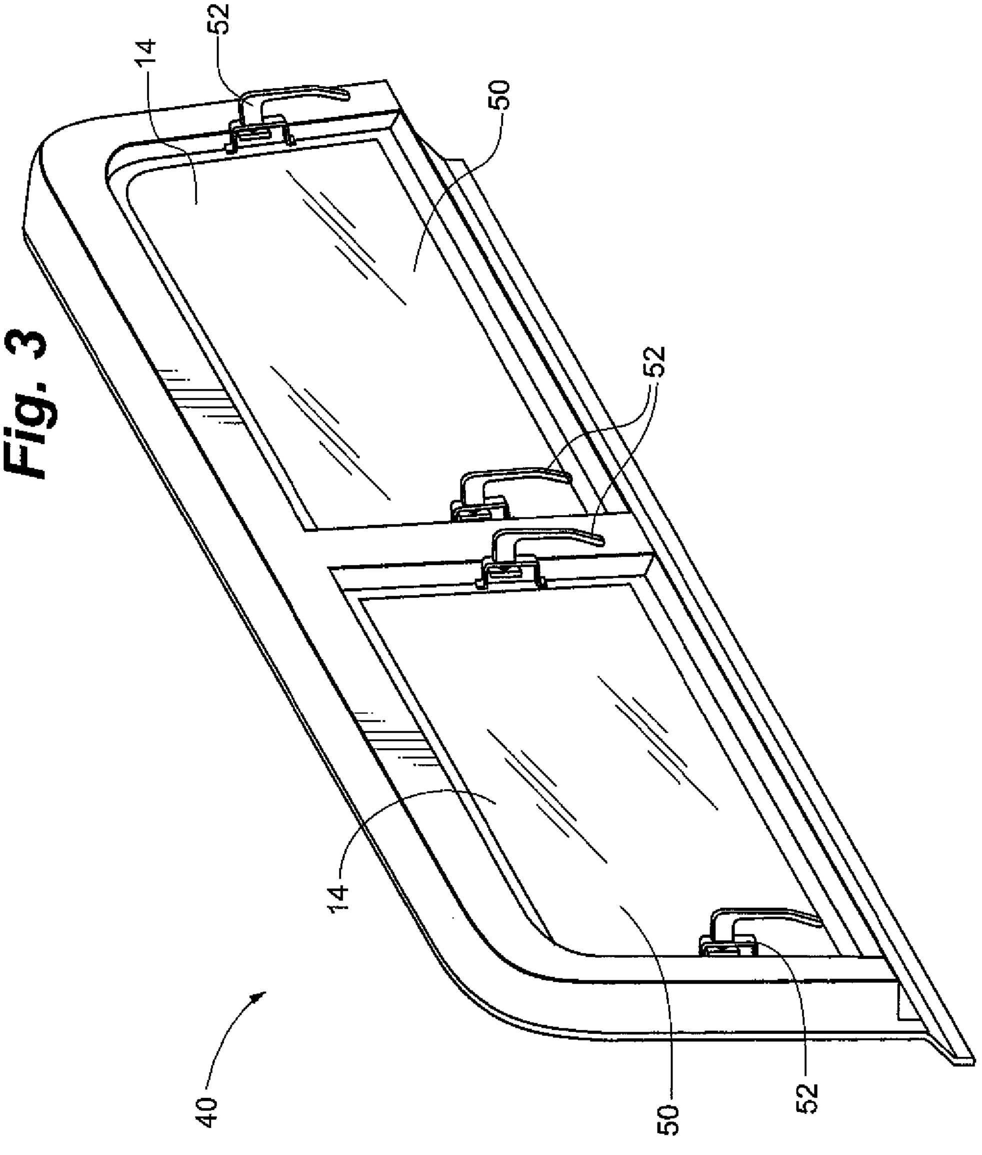
FIG. 3 is a perspective view of a M1114 windshield assembly with an embodiment of the present invention.
Figure 4:
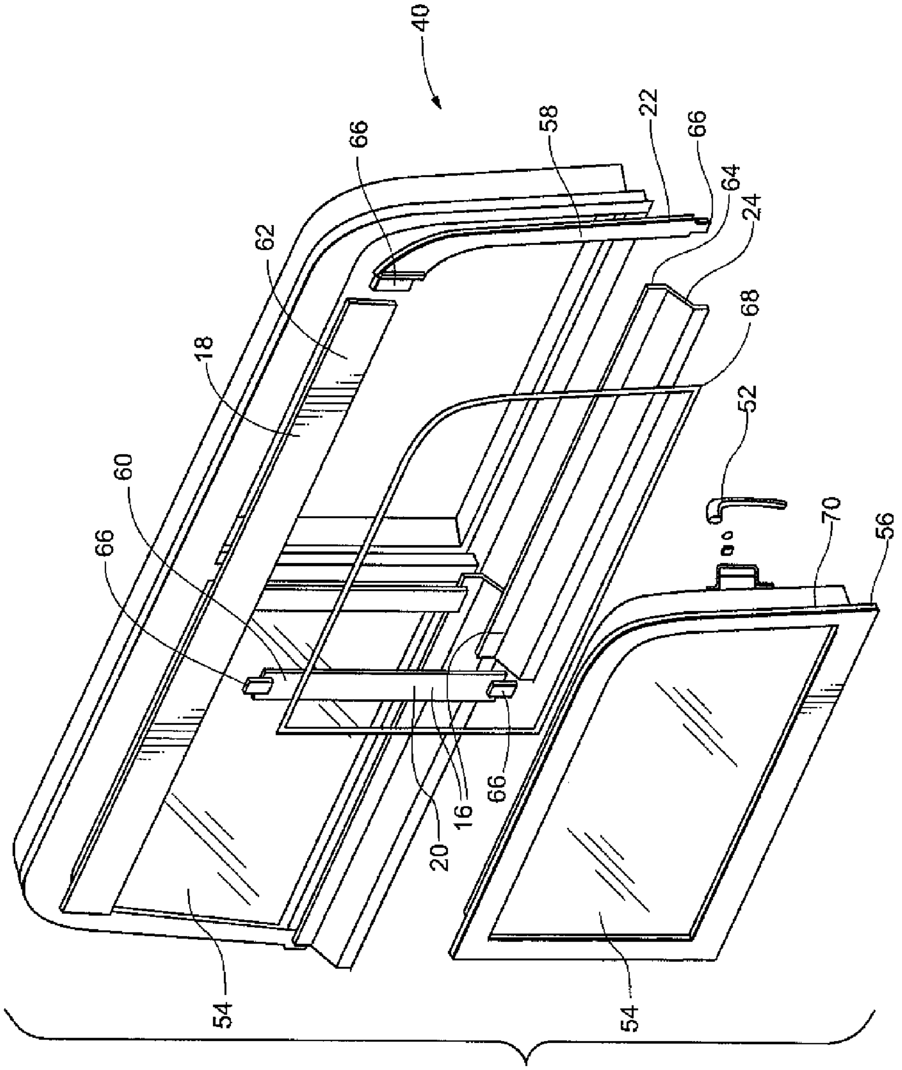
FIG. 4 is an exploded perspective view of a M1114 windshield assembly with the embodiment of the present invention of FIG. 3.
Figure 5:
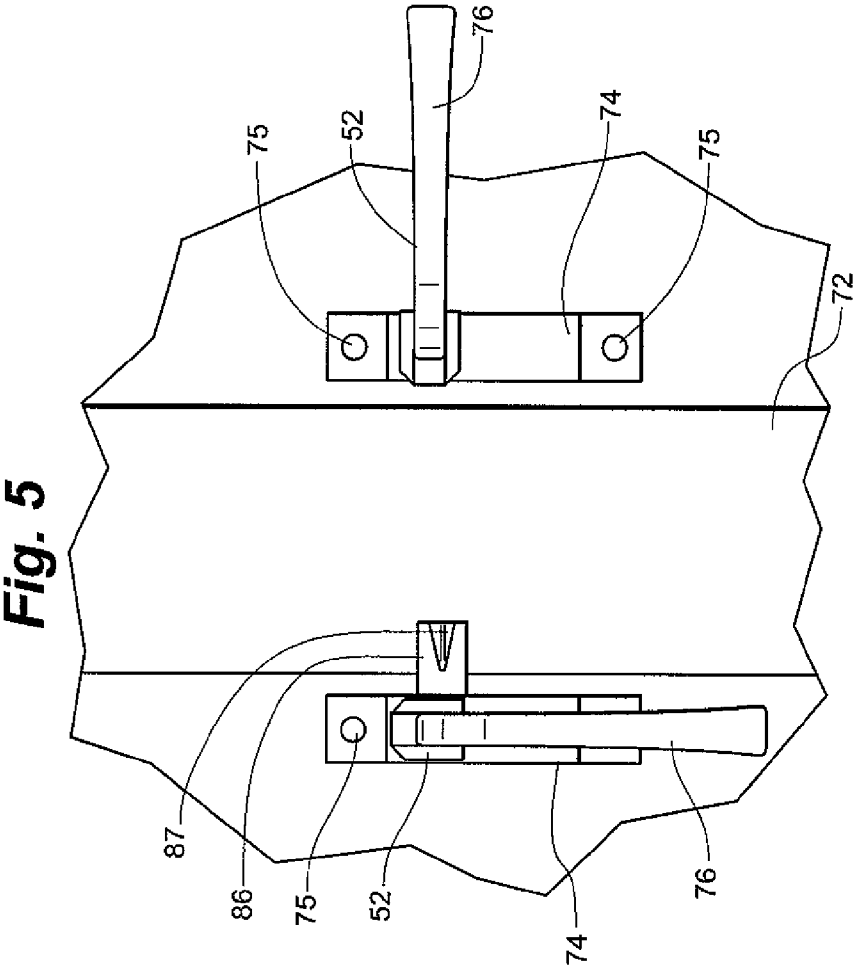
FIG. 5 is a side plan view of the latch mechanism of a first embodiment of the present invention where one latch is shown open and one latch is in the closed position.
Figure 6:
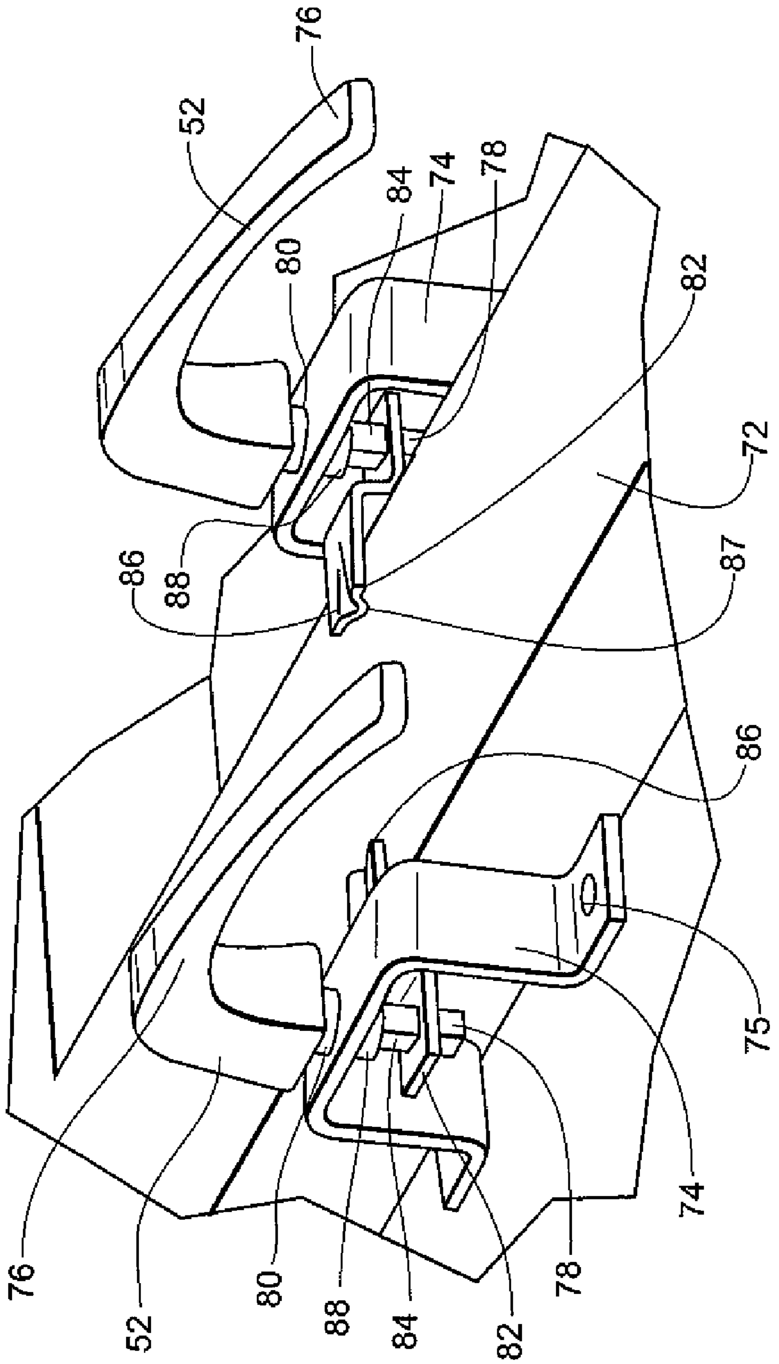
FIG. 6 is a perspective view of the latch mechanism of a first embodiment of the present invention.
Figure 7:
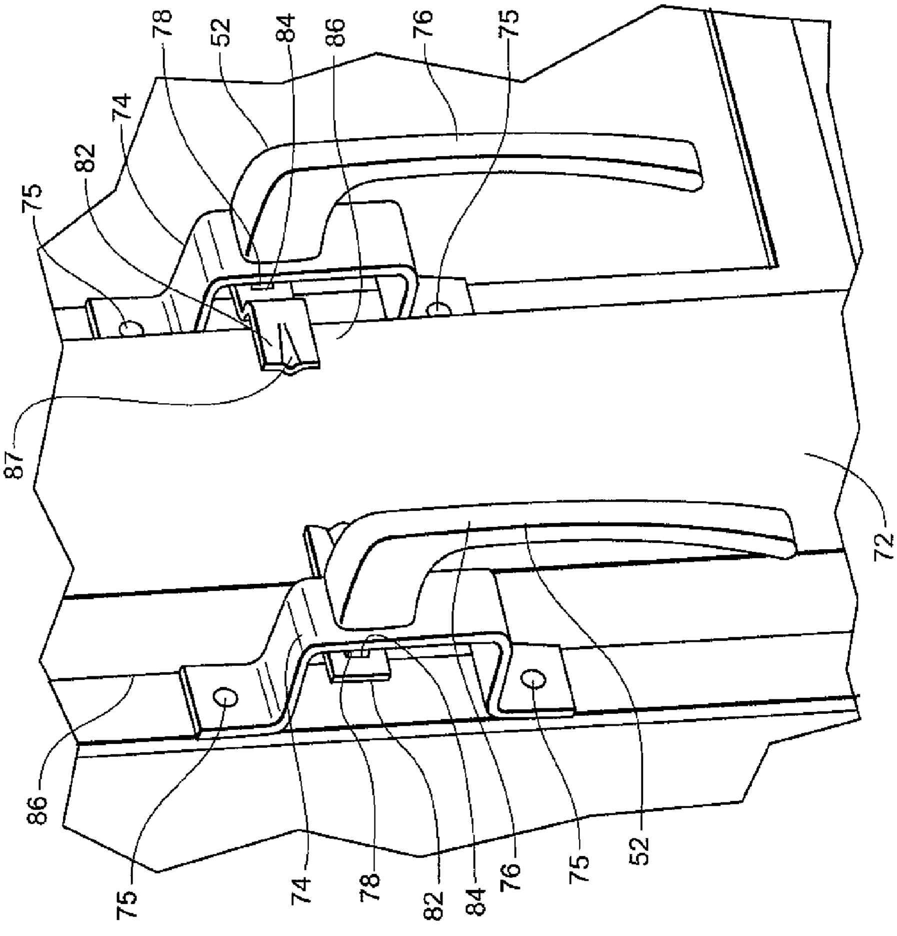
FIG. 7 is a perspective view of the latch mechanism of a first embodiment of the present invention.
Figure 8:
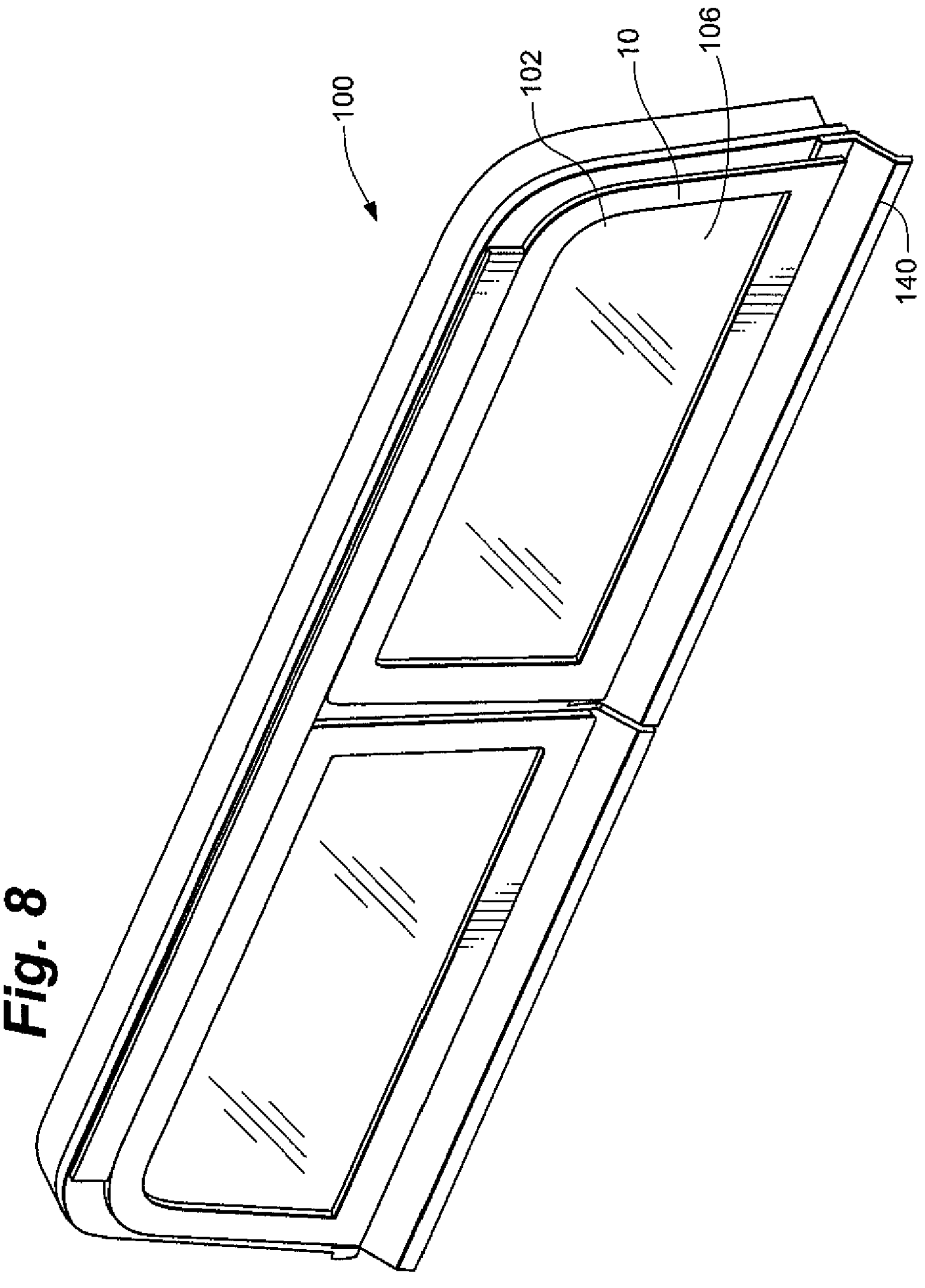
FIG. 8 is a perspective view of another embodiment of the present invention.
Figure 9:
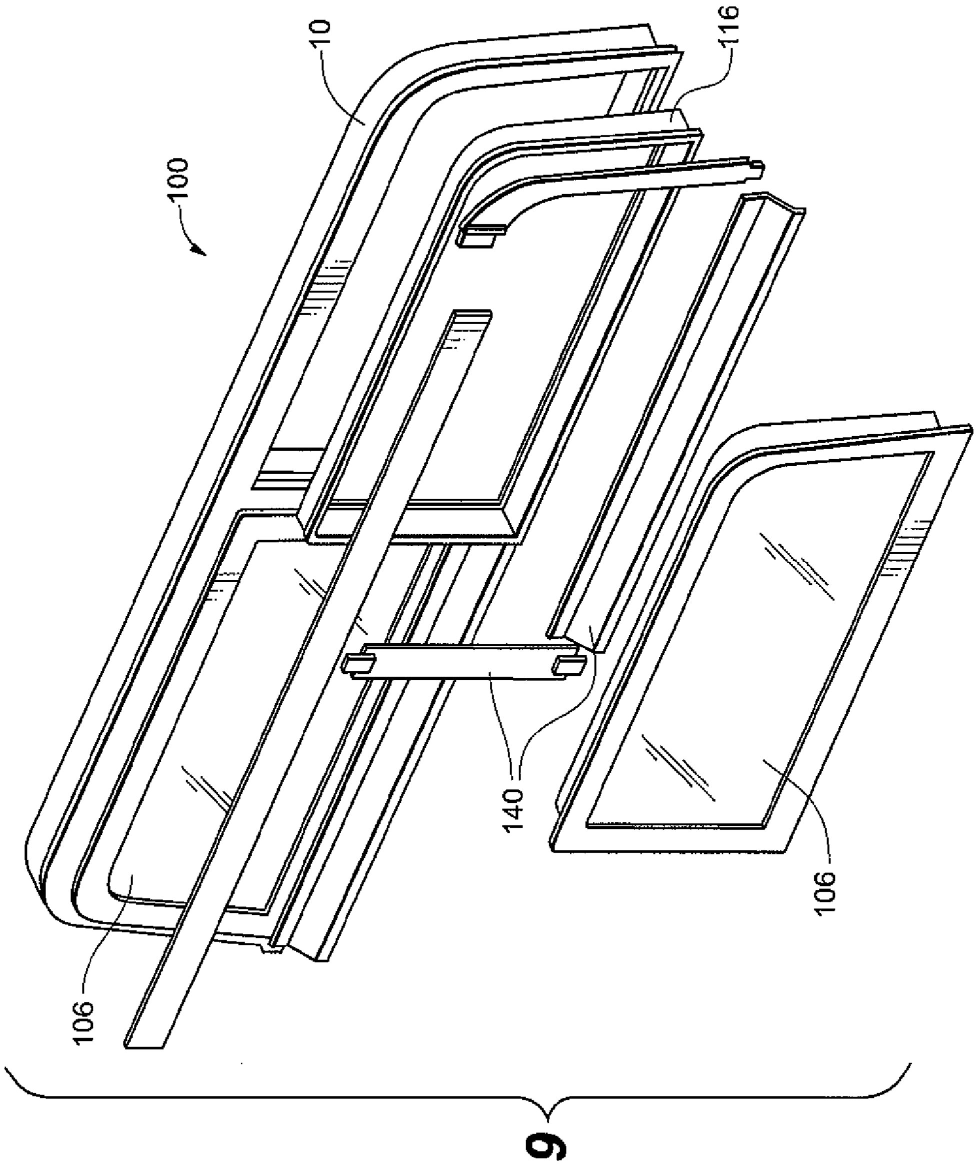
FIG. 9 is an exploded perspective view of the components of the embodiment of FIG. 8.
Figure 10:
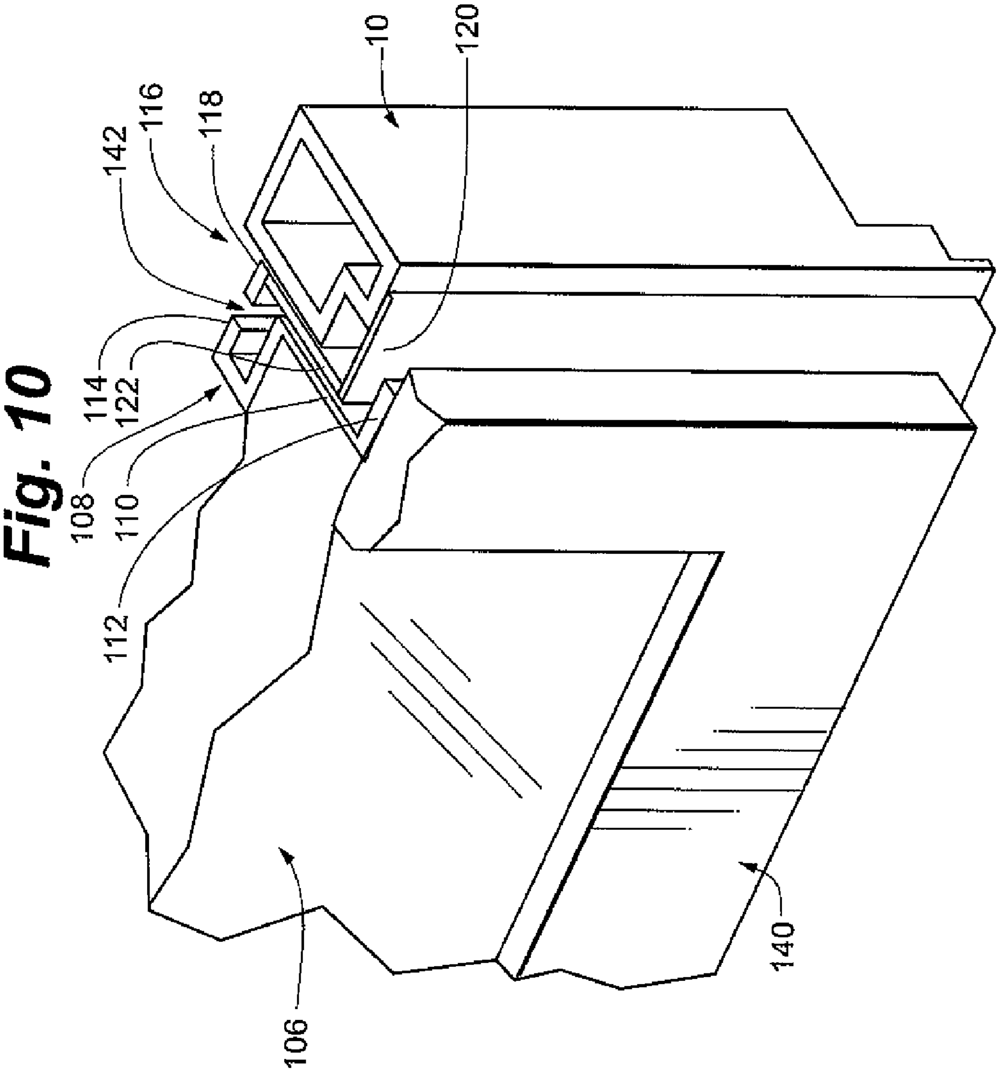
FIG. 10 is a cut away perspective view of the embodiment of FIG. 8.
Figure 11:
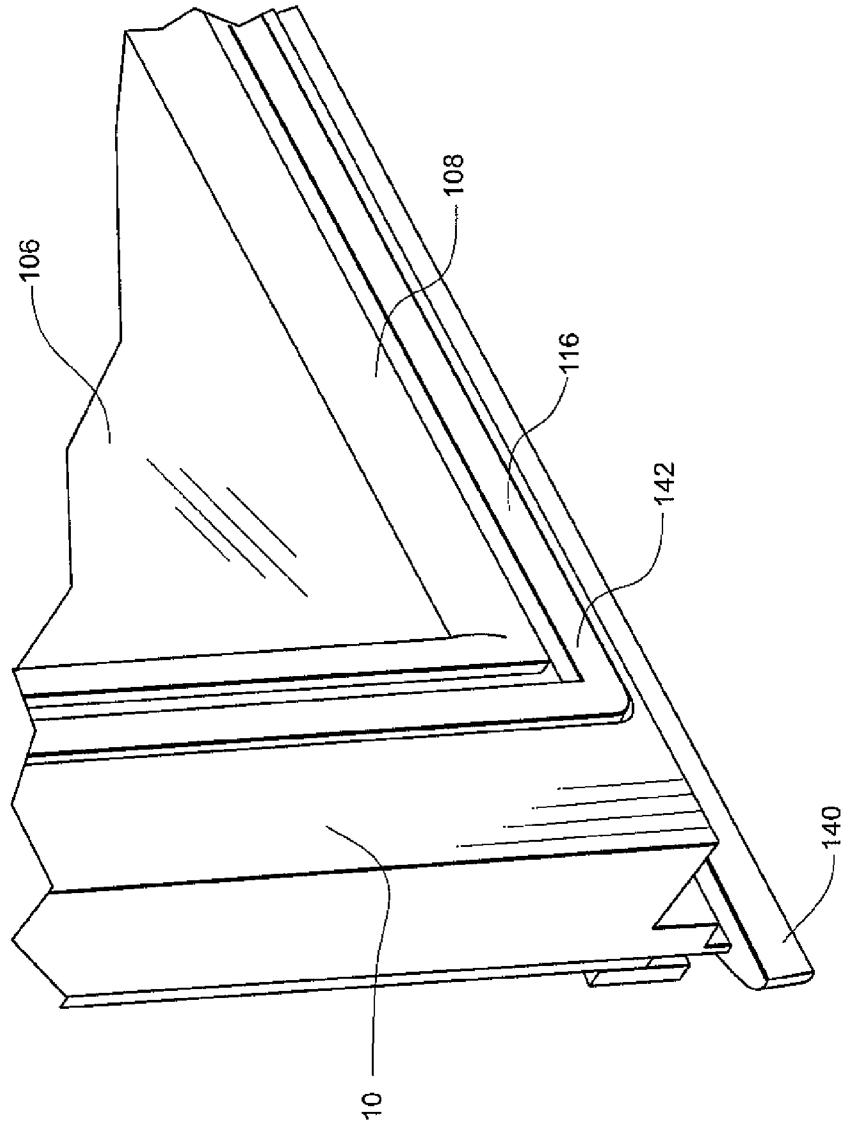
FIG. 11 is a perspective view of the interior side of the window depicted in FIG. 8.
Figure 12:
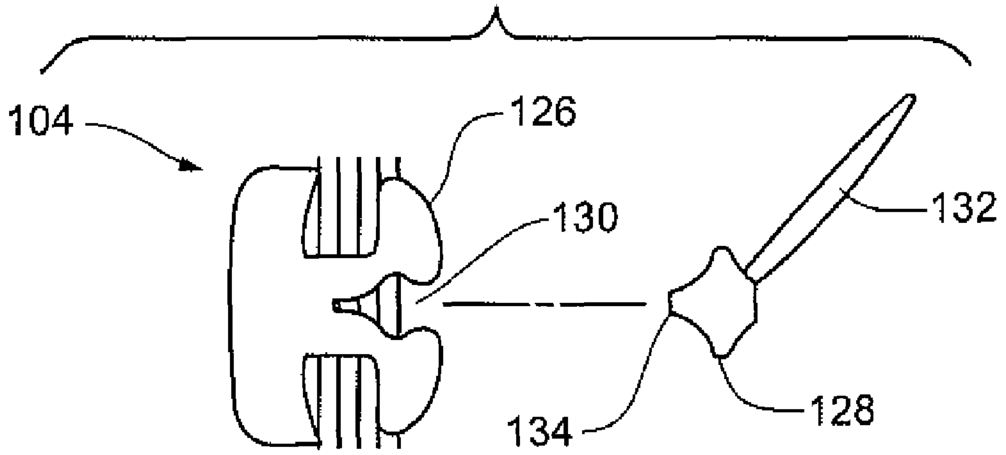
FIG. 12 is a cross sectional view of the gasket assembly of the embodiment depicted in FIG. 8.

In one embodiment, the present invention egress assembly 40 includes a transparent armor assembly 50 with a rotary locking mechanism 52. As illustrated in FIGS. 3-7 the standard M1114 window frame 10 as previously described with reference to FIGS. 1 and 2 is utilized with modifications to the above described prior art transparent armor 14. Here, the transparent armor assembly 50 includes a transparent armor pane 54 surrounded about the perimeter by an armored flange 56. The armored flange 56 extends peripherally from transparent armor pane 54 to support the transparent armor pane 54 within window frame 10. In assembly, the armored flange 56 is disposed exterior to window frame 10, supported by the outer margin of the window frame 10. In order to incorporate transparent armor assembly 50 into the overall armored condition of the M1114 or like vehicle, the window spacer/sill 16 is preferably modified. Specifically, side armor plates 22 have an exterior side face 58 that is narrowed. Likewise, center armor plate 20 has a narrowed exterior center face 60 and upper window armor plate 18 includes a narrowed exterior upper face 62. Lower window armor plate 24 includes a raised flange 64 that provides a support backing for the armored flange 56. Side armor plates 22 and center armor plate 20 may also include connector flanges 66 on the opposing vertical ends. The connector flanges 66 extend distally so as to overlap the upper window armor plate 18 and raised flange 64. A window gasket 68 is disposed between the interior face 70 of armored flange 56 and the outside margin of the window spacer/sill 16.

On the interior face 70 of transparent armor assembly 50, a plurality of rotary lock mechanisms 52 are mounted. It is understood that a single rotary lock mechanism 52 might be employed within opposed removable locking bracket in all embodiments employing rotary lock mechanism 52. Such bracket (not shown) might be U-shaped with a leg engaging the respective interior and exterior faces of the structure supporting the transparent armor assembly 50. A further embodiment is a hinge with a readily removable hinge pin. Other embodiments are also possible. Each (or the single) rotary lock mechanism 52 includes a lock support 74 and a lock handle 76 operably connected by a through shaft 78. Lock support 74 is a bracket with mounting apertures 75 positioned at opposing sides. While lock handle 76 is disposed on an exterior side of lock support 74, a cam 82 disposed on shaft 78 is positioned on the inboard side of lock support 74. The through shaft 78 is rectangular in this embodiment but may have any shape that interacts with the cam 82. Cam 82 includes a cam aperture 84 for mounted connection with through shaft 78. The cam 82 extends distally to a frame engaging portion 86. The frame engaging portion 86 may include a semicircular dimple 87 or a rounded valley to provide less resistance during rotation of lock handle 76. Lock handle 76 includes a cylindrical shaft lug 88 that extends through support aperture 80. The through shaft 78 then extends distally from cylindrical shaft lug 88.

In operation, the standard window is retrofitted with a modified transparent armor pane 54 to which a plurality of rotary lock mechanisms 52 are operably coupled. To remove the transparent armor pane 54, the vehicle occupants rotate lock handle 76 a ¼ turn to release cam 82 from contact with the interior of window frame 10 to unlock all interiorly disposed lock mechanisms on a selected transparent armor pane 54. The transparent armor pane 54 may then be pushed outward disengaging it from window frame 10. The occupants may egress through the resulting aperture or egress portal.

With a bracket, the single rotary lock mechanism 52 is unlocked. The transparent armor pane 54 is then pushed outward and slid slightly sideward to disengage the bracket from the window frame 10 to define an egress portal. With a hinge, the single rotary lock mechanism 52 is unlocked and the hinge pin removed. The transparent armor pane 54 is then pushed outward to define an egress portal.

The rotary lock mechanism 52 may be substituted by a slide bar, sash lock or other variant mounted to the transparent armor pane 54. For example, FIG. 13 includes an embodiment using the same transparent armor assembly 50 as discussed with reference to FIGS. 3-7 but substitutes a sliding latch assembly 90 for the rotary locking mechanism 52.

In one embodiment of the present invention of the egress assembly 100 as illustrated in FIGS. 8-12, the transparent armor assembly 102 is held in place by a gasket fastener 104. Utilizing standard window frame 10 and a modified external armor set 140 as a base, the transparent armor 106 is attached to vehicle window frame 108. The vehicle window frame 108 includes frame element 110 disposed about the perimeter of transparent armor 106. The exterior portion of vehicle window frame 108 includes armored flange 112. The interior portion of vehicle window frame 108 includes a distal gasket barrier 114. The distal gasket barrier 114 forms a "U" shape for partially restraining gasket fastener 104.

Outer fastener bracket 116 is disposed between vehicle window frame 108 and standard (prior art) window frame 10. The outer fastener bracket 116 includes proximal gasket barrier 118 at a first end and lower armored flange 120 at a second end connected by bracket connector 122. The bracket connector 122 extends generally parallel to the frame element 110. Proximal gasket barrier 118 and distal gasket barrier 114 form the gasket fastener gap 142.

Gasket fastener 104 bridges the gasket fastener gap 142 between proximal gasket barrier 118 and distal gasket barrier 114. Gasket fastener 104 is fabricated from molded rubber or a similar compliant material. Gasket fastener 104 includes gasket body 126 and gasket lock strip 128. Gasket body 126 includes an aperture or slot 130 disposed axially within gasket body 126 sized to accommodate gasket lock strip 128. Slot 130 is disposed on the interior (in the vehicle interior) portion of the egress assembly 100 when the egress assembly 100 is disposed in the window frame 10 and preferably extends around the full periphery of the transparent armor assembly 102. In this embodiment the gasket lock strip 128 has a triangular attachment face 134. A handle 132 may be attached to the gasket lock strip 128 for ease of removal.

In operation, disposing the gasket lock strip 128 in the slot 130 acts to expand the gasket fastener 104, thereby fixing the transparent armor assembly 102 in place. To disengage the transparent armor assembly 102, the occupant pulls handle 132 to remove gasket lock strip 128 from gasket body 126. This causes the gasket fastener 104 to relax its fixing grip on the transparent armor 106. The occupant can then apply force to transparent armor 106 so as to push it exterior to the vehicle, thereby creating an egress portal.

Figure 15:
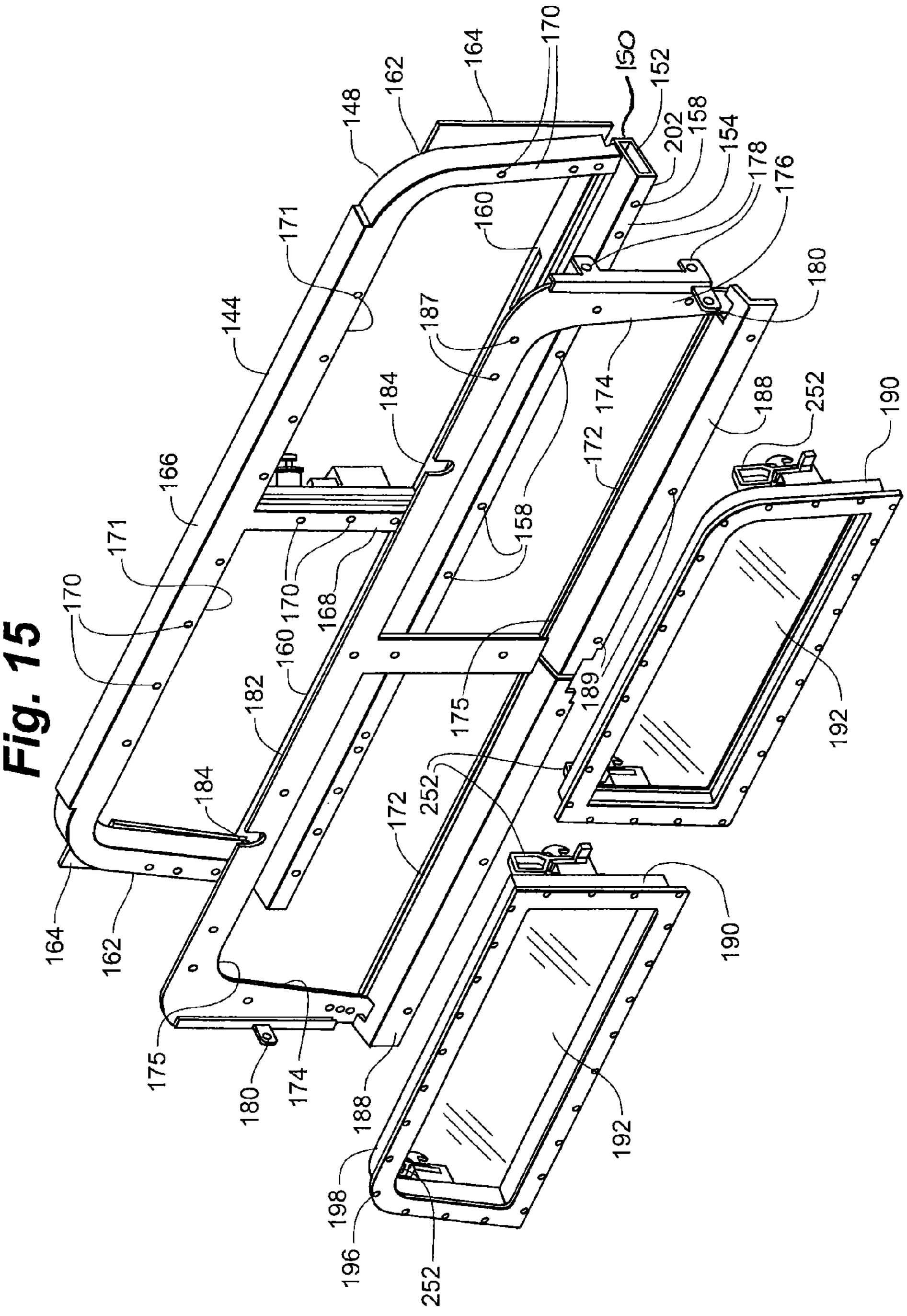
FIG. 15 is an exploded exterior perspective view of the integrated armored window assembly of FIG. 13.
Figure 17:
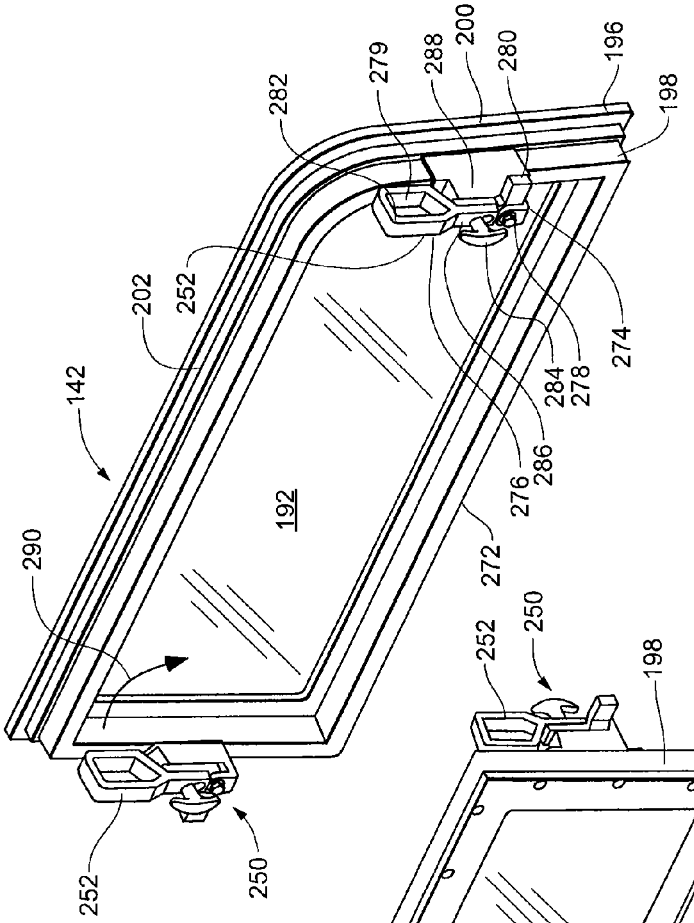
FIG. 17 is an interior perspective view of the driver's window assembly of FIG. 16.
Figure 16:
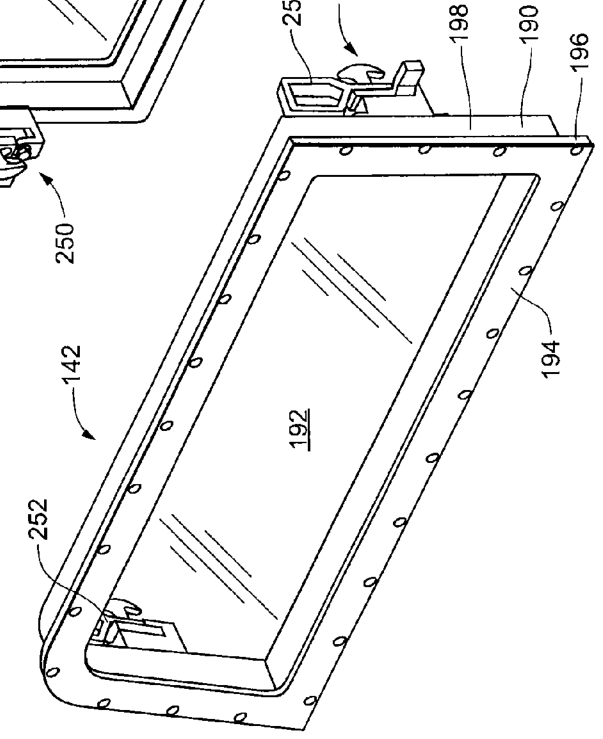
FIG. 16 is an exterior perspective view of a driver's window assembly.

The vehicle emergency egress assembly of a further embodiment present invention is depicted generally at 130 in FIGS. 15-17. An advantage of this embodiment is that the configuration implements an armor structure that is monolithic as opposed to an assembly of component armor plates in the prior art. The monolithic armor structure 140 of the present invention allows an integrated approach to be taken to addressing the armor and sill issue. The philosophy behind this configuration is to use the armor as the reference for the integration of the monolithic armor structure 140 with the vehicle. This approach eliminates tolerance and discontinuity issues with the vehicle window frame and further eliminates dealing with multiple armor components. The monolithic structure of the monolithic armor structure 140 allows for a more controlled armor design which facilitates a more reliable and robust sill design for the monolithic armor structure 140.

This approach has some key benefits over other approaches, as noted above. The combination of the two sides, the top, the bottom and the center armor plates being replaced by a single monolithic plate provides additional structural integrity to the vehicle window frame. An identified high risk associated with the vehicle emergency egress (VEE) window is the potential for the thin walled window frame to collapse and bind the window after an accident. The structure provided by the armored configuration of the present invention provides an exoskeleton capability to preserve the integrity of the window openings in the event of an accident and help to mitigate this risk. In addition to the armored plate, vertical channel sections may be integrated with the armor to provide an even greater structural enhancement.

The replacement of the component armored plates of the prior art with a monolithic armored structure 140 simplifies the seating interface of the vehicle emergency egress assembly 130. The prior art implementation with component armored plates presents a number of issues due to the potential misalignment of the planes of these plates and the resulting challenges to provide a planar seating surface for the window. Replacing the component armor of the prior art with the single monolithic plate results in a single seating surface that provides an optimum planar surface to interface with armored windows 142.

The construction of the monolithic armor structure 140 provides the opportunity to reasonably control the tolerance of the opening that accepts the armored windows 142. This capability, in conjunction with the philosophy of referencing the windows to the armor rather than to the window frame of the vehicle, is a significant benefit for the design of sill 202 in order to ensure a reliable and consistent fit.

The construction of the monolithic armor structure 140 further eliminates the interfaces of the component armor plates of the prior art and the need for gap protection in the gaps at the interfaces of the component armor plate. This is a benefit for the protection of the occupant's vehicle as well as simplification of the design of the sill 202, as noted below.

Figure 13:
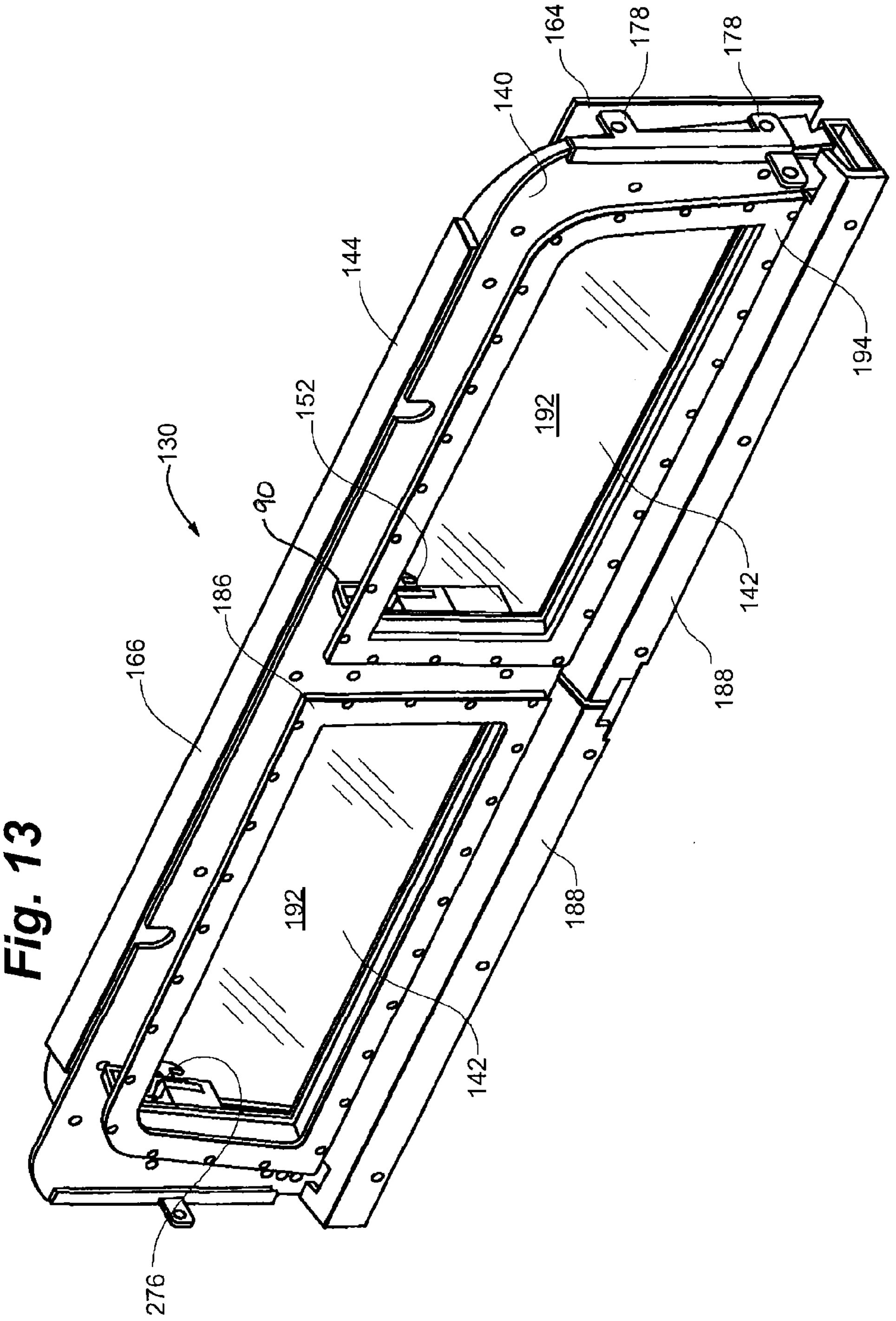
FIG. 13 is an exterior perspective view of an integrated armored window assembly of the present invention.
Figure 14:
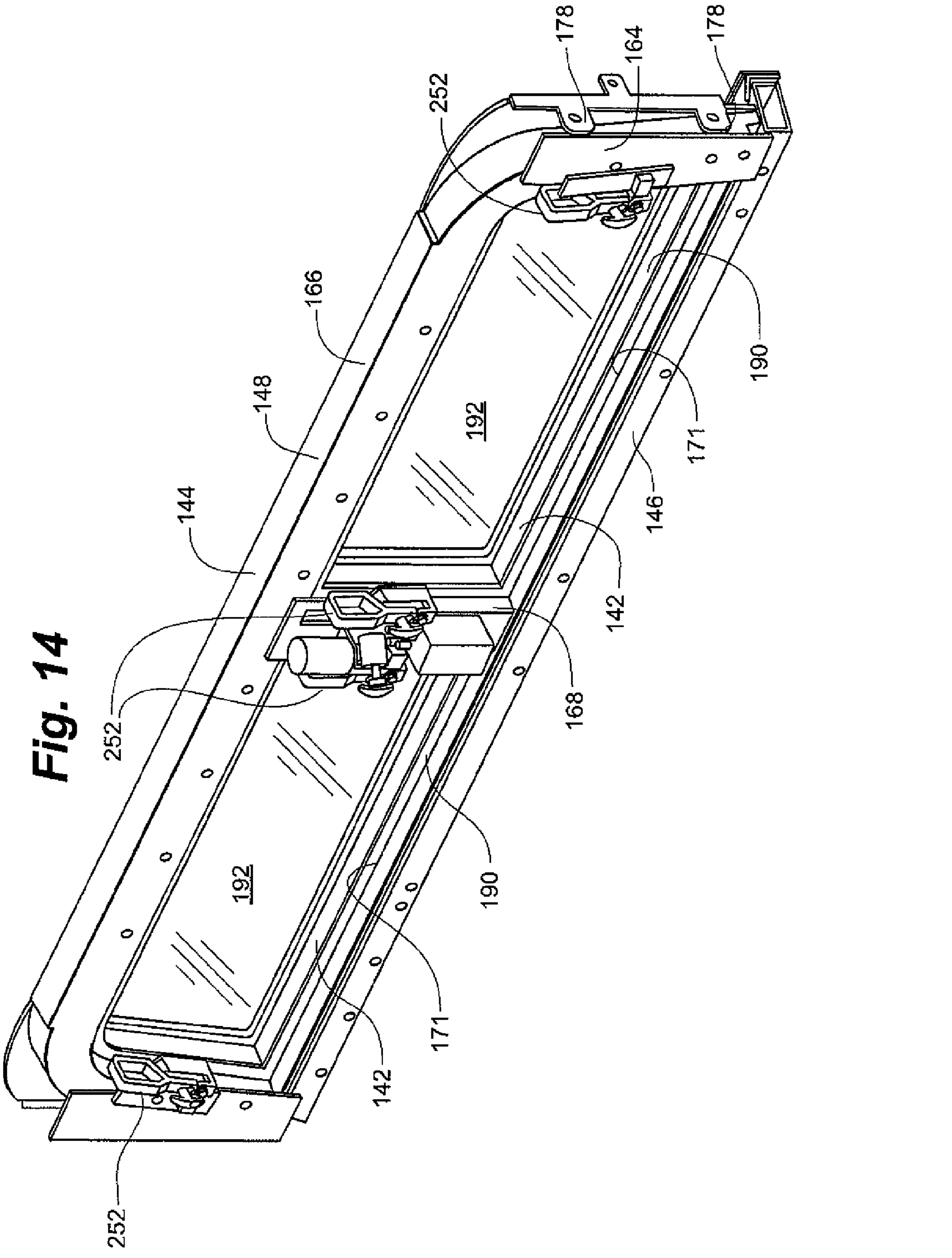
FIG. 14 is an interior perspective view of the integrated armored window assembly of FIG. 13.

The vehicle emergency egress assembly of this embodiment of the present invention is shown generally at 130 in the FIGS. 13-25. The vehicle emergency egress assembly 130 includes two major components, the monolithic armor structure 140 and the armored window(s) 142. As illustrated in FIGS. 13-15, the vehicle window frame 144, in this case, the standard M1114 window frame, noted as 10 above, is utilized. The vehicle window frame 144 includes sill 202 and a bow 148. The sill 202 is formed of a rectangular section tube 150. The rectangular section tube 150 defines an interior space 152. The sill 202 presents a forward directed margin 154. A plurality of bores 158 are defined in the forward margin 154.

The bow 148 is fixedly coupled to the sill 202. The bow 148 includes a base 160 that resides in part on the sill 202. A pair of opposed, spaced apart sides 162 are upwardly directed from the base 160. Each of the sides 162 includes a plate 164 fixedly coupled thereto on the inward directed face of the respective side 162.

A top 166 of the bow 148 extends between the sides 162 and is disposed in a generally parallel relationship with the base 160. A center bar 168 is centrally disposed along the base 160 and extends between the base 160 and the top 166. A plurality of bores 170 are defined in a forward directed faces of the sides 162, top 166, and center bar 168. The base 160, sides 162, top 166, and center bar 168 cooperatively define a pair of adjacent window apertures 171.

The monolithic armor structure 140 is integrally formed in a monolithic structure. The monolithic armor structure 140 includes a bottom plate 172. The bottom plate 172 is formed integral with a pair of side margins 176, a top margin 182, and a center plate bar 186 as a single unit. Each of the side margins 176 presents inward directed tabs 178. Further, each of the side margins 176 presents an outward directed tab 180. The top margin 182 extends between the respective side margins 176. The top margin 182 may include a notch 184 through which an accessory, such as a windshield wiper, may be directed. The integrally formed center plate bar 186 is centrally disposed with respect to the bottom plate 172 and the top margin 182 and extends between the bottom plate 172 and the top margin 182.

A preferably L-shaped sill bar 188 may be disposed overlying the sill 202 of the vehicle window frame 144. The sill bar 188 presents a plurality of forward directed bores 189.

The inner perimeter margin 175, defined in part by the bottom plate 172, the respective side margin 176, the top margin 182, and the center plate bar 186, defines a pair of respective adjacent transparent armor assembly (TAA) apertures 174.

Figure 19:
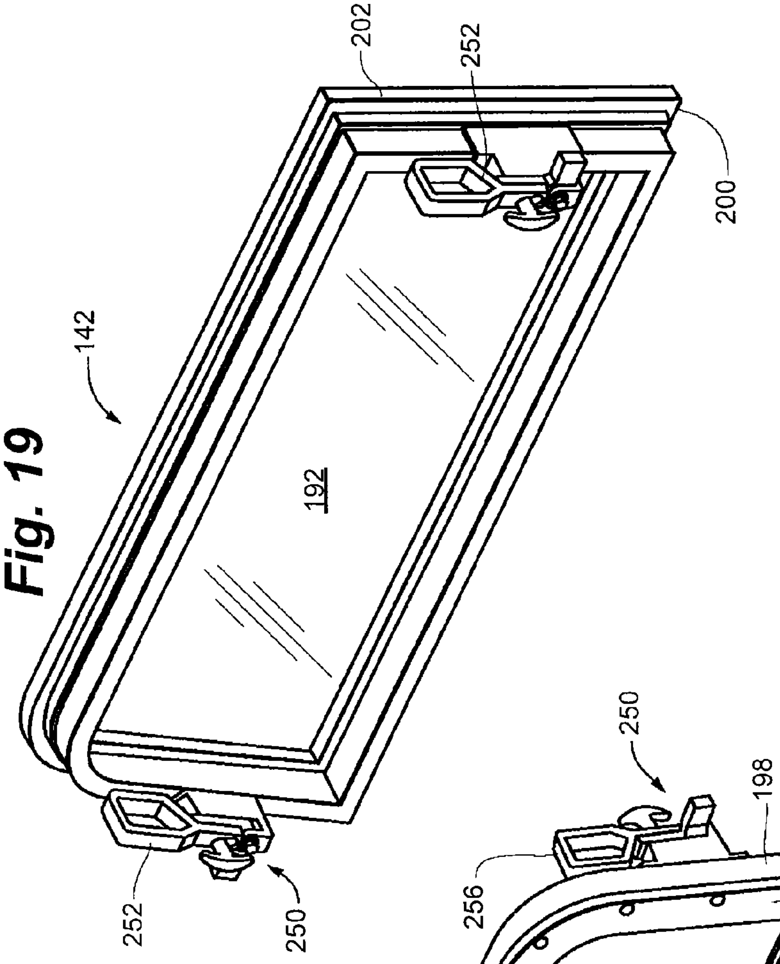
FIG. 19 is an interior perspective view of the passenger's window assembly of FIG. 18.
Figure 18:
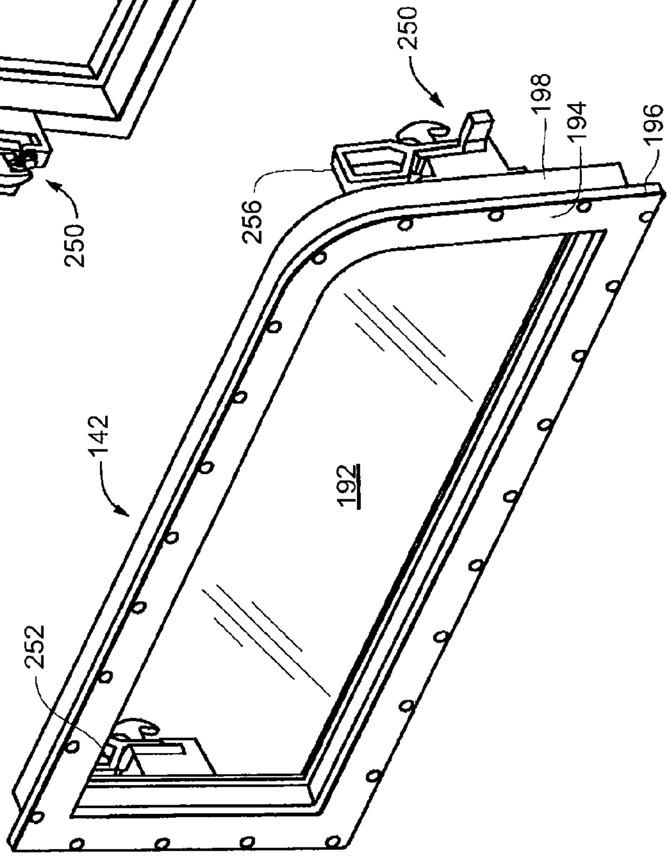
FIG. 18 is an exterior perspective view of a passenger's window assembly.

The second component of the vehicle emergency egress assembly 130 is the armored window 142, as depicted in FIGS. 16-19. The armored window 142 includes a frame 190. The frame 190 peripherally supports an armored pane 192. The frame 190 is disposed about the outer perimeter margin of the armored pane 192. An armor surround 194 is fixedly coupled to the forward directed face of the frame 190. The armor surround perimeter 196 of the armor surround 194 has greater dimensions than the frame perimeter 198 of the frame 190, thereby forming an inward directed flange 200, as depicted in FIGS. 17 and 19.

A interiorly accessible release means 250 illustrated in FIGS. 15-19, 24 and 25 as a plurality of rotary lock mechanisms 252 are mounted on the interior face 272 of armored window 142. Each rotary lock mechanism 252 includes a lock support 274 and a lock handle 276 operably, rotatably connected by shaft 278 (being a bolt in this case) to the frame 190. The lock handle 276 includes a handle 279 and a cam 280. The handle 278 preferably has a grasping aperture 282 defined therein. A locking pin 284 extends through a bore 286 defined in the lock handle 276. The shank (not shown) of the locking pin 284 extends through the bore 286 and into a blind bore (not shown) defined in the supporting lug 288. The locking pin 284 must be withdrawn before the lock handle can be rotated to unlock the armored window 142. In the locked disposition depicted if FIGS. 18*a*. 18*b*, 19*a*, and 19*a*, the cam 280 is designed to lockingly engage the inward directed face of the plate 164 of the vehicle window frame 144, thereby locking the armored window 142 in place. Unlocking motion is as indicated by the arrow 290 of FIG. 8*b*. In the unlocked disposition, the armored window 142 may be readily manually ejected outward, thereby exposing the transparent armor assembly aperture 174, forming an egress portal through which a vehicle occupant may egress the vehicle.

Figure 20:
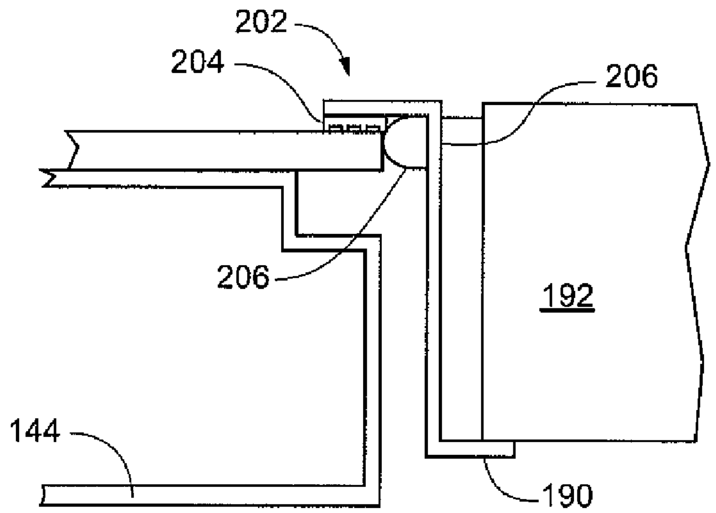
FIG. 20 is a top plan view of the seal integration.

The sill integration of the present invention is depicted in FIG. 20. The sill 202 of the vehicle emergency egress assembly 130 must perform two functions. The first function is to provide a barrier to contaminants that may enter the crew cab via the interface of the armored window 142 in the monolithic armor structure 140. This function is the classic weather sill function. The second function is to provide means for positioning the armored window 142 in the center of the transparent armor assembly aperture 174 of the monolithic armor structure 140 and to provide the feature that holds the armored windows 142 in place. This second function is required because the dimensions of the transparent armor assembly aperture 174 and of the window aperture 171 defined in the vehicle window frame 144 are larger than the frame perimeter 198 of the frame 190 of the armored window 142. The sill 202 must support and cushion the armored window 142 in the up/down and left/right directions.

The sill 202 preferably includes two separate sills, flat sill 204 and raised sill 206. Highly compressible EPDM foam preferably provides the classic weather sill function. Other compliant materials may be used as well. This foam comprises the flat sill 204. The flat sill 204 is adhesively bonded to the inward directed flange 200 of the armored window 142. The flat sill 204 is extended around the entire perimeter of the inward directed flange 200. The flat sill 204 compresses against the structure of the monolithic armor structure 140 when installed on the vehicle.

Figure 21:
FIG. 21 is a perspective view of a first seal.

FIG. 21 illustrates a preferable COT profile that is preferentially implemented for the flat sill 204. The specific material is provided by Clean Seal, Inc., of South Bend, Ind., and provides a compression deflection of 25% at 2-5 PSI. This correlates to approximately 80-195 lbs compression (preload from the combined two rotary lock mechanisms 252) on each armored window 142. This compression compresses the material of the flat sill 204 approximately 0.050 inches.

Figure 22:
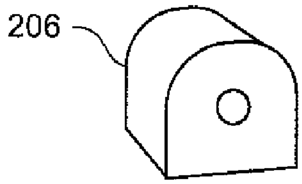
FIG. 22 is a perspective view of a second seal.

The raised sill 206 is illustrated in FIG. 22. Raised sill 206 is a D-Section sill that provides the means of positioning the armored window 142 in the center of the transparent armor assembly aperture 174 and in holding the armored window 142 in place. The raised sill 206 is adhesively bonded under the inward directed flange 200 to the frame 190 around the entire perimeter of the frame 190. The raised sill 206 slightly compresses against the monolithic armor structure 140 when installed on the vehicle. The height dimension of the D-Section of the raised sill 206 is a function of the current armored window 142 dimension specified in the monolithic armor structure 140.

Figure 23:
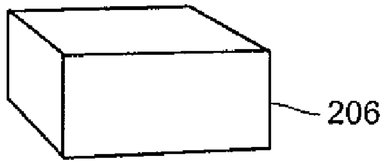
FIG. 23 is a perspective view of a second embodiment of the second seal.
Figure 24:
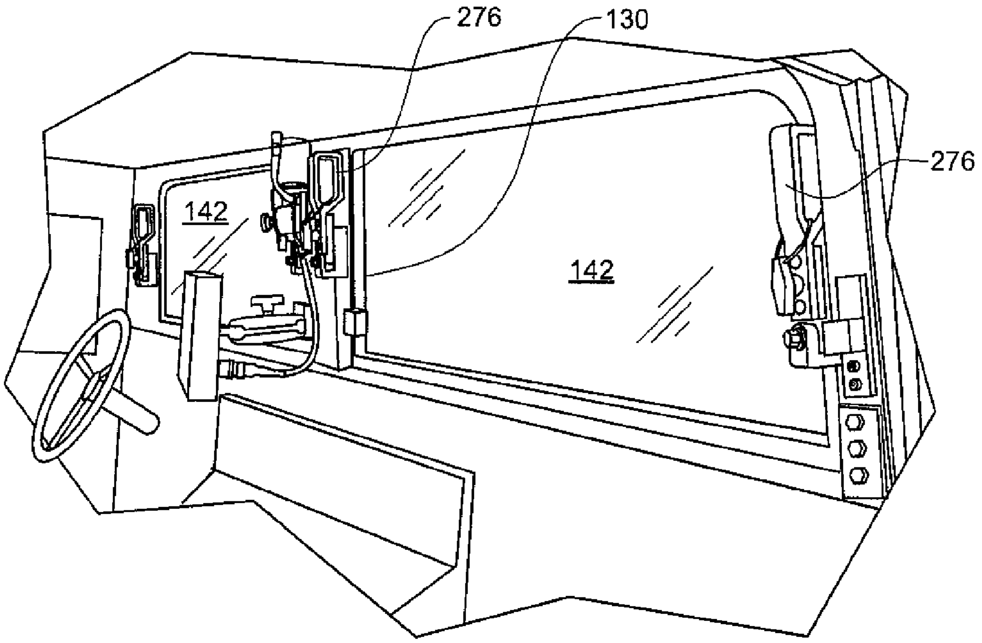
FIG. 24 is an interior perspective of the vehicle emergency egress window of the present invention.
Figure 25:
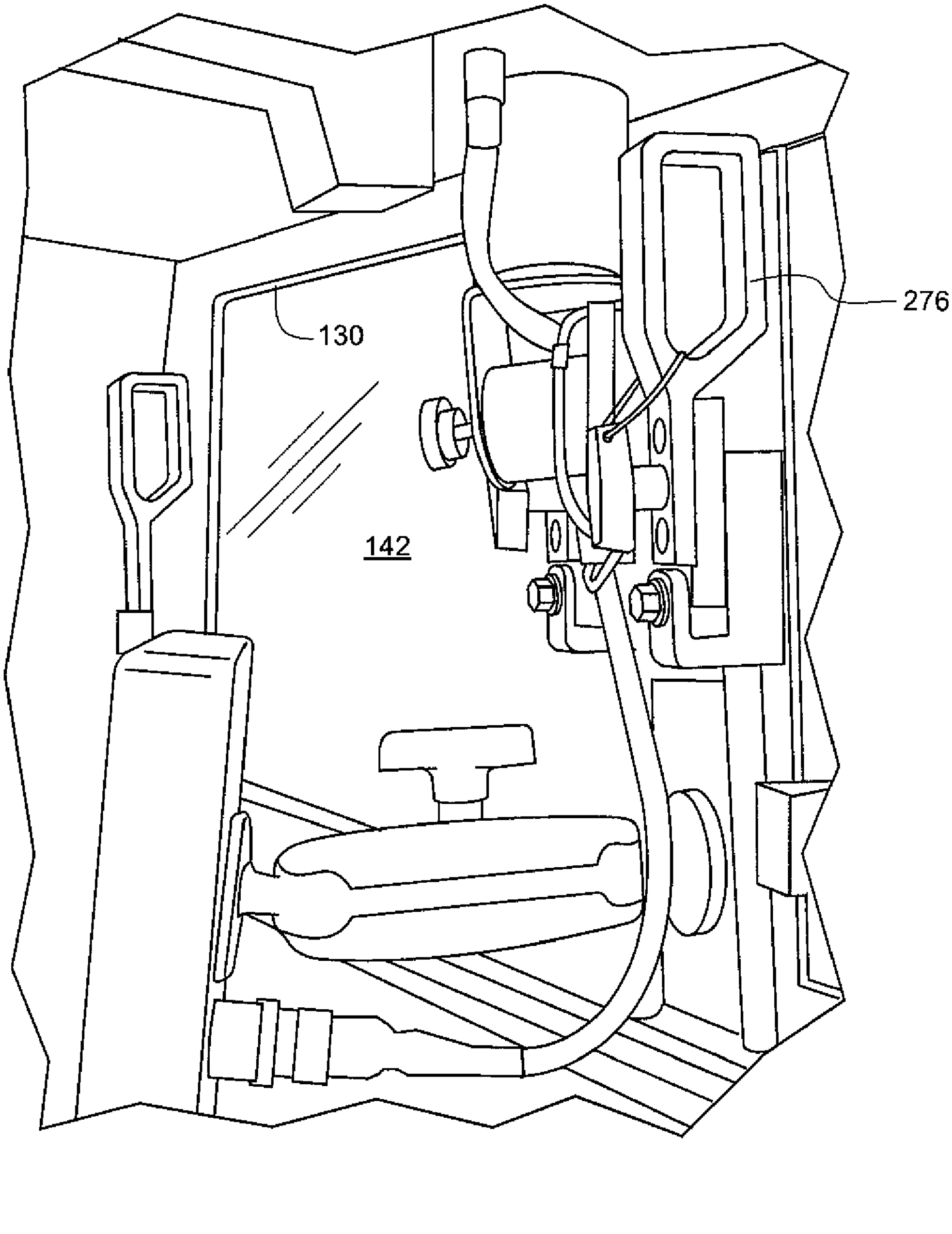
FIG. 25 is an enlarged interior perspective of a portion of the vehicle emergency egress window as depicted in FIG. 24.

It may be advantageous to substitute a more dense sill material for the raised sill 206 along the bottom margin of the armored window 142 in order to better support the weight of the armored window 142. For this area, EPDM bar stock, as depicted in FIG. 23, may be substituted for the D-Section raised sill 206.

In assembly, the monolithic armor structure 140 is mated to the vehicle window frame 144 by means of suitable fasteners disposed through the bores 187 that extend around the perimeter of the monolithic armor structure 140. The fasteners then engage the frame bores 170 defined in the vehicle frame 144. The positioning of the monolithic armor structure 140 with respect to the vehicle window frame 144 is determined by the abutment of the inward directed tabs 178 against the outward directed face of the plate 164. After the monolithic armor structure 140 is in place, the sill bar 188 may be affixed to the sill 202 of the vehicle window frame 144. Again such fixation is effected by fasteners passing through the forward directed bores 189 defined in the sill bar 188 and coupling with the bores 158 defined in the sill 202.

After the monolithic armor structure 140 is affixed to the vehicle, the two armored windows 142 may be inserted into the transparent armor assembly apertures 174 from the outside of the vehicle. Such insertion effects the sealing of the sill 202 with the monolithic armor structure 140, clamping rotation of the rotary lock mechanisms 252 into the locked disposition effecting compression of the flat sill 204.

While the invention is amenable to various modifications and alternative forms, specifics thereof have been shown by way of example in the drawings. It should be understood, however, that the intention is not to limit the invention to the particular embodiments described. On the contrary, the intention is to cover all modifications, equivalents, and alternatives.

The invention claimed is:

1. A vehicle emergency egress assembly, comprising:

a monolithic armor structure defining at least one armor aperture, the monolithic armor structure including a pair of side margins, wherein each side margin includes an inward directed tab, the inward directed tabs abutting a corresponding plate on an inward directed face of a vehicle window frame at least one armored window disposable in the at least one armor aperture, the armored window including a frame that supports at least one armor pane, the frame including a rotary locking mechanism, said rotary locking mechanism engaging the plate on the inward directed face of the vehicle window frame, the rotary locking mechanism being selectively operable by a vehicle occupant for effecting release of the at least one armored window, such release permitting shifting of the at least one window from the at least one armor aperture to define an egress portal.

2. The egress system of claim 1 wherein the at least one transparent armor pane is secured in place in the transparent armor assembly by a respective peripheral gasket.

3. The egress system of claim 2 wherein the peripheral gasket includes a lock strip removably disposed in a slot defined in the gasket.

4. The egress system of claim 3 wherein the emplacement of the lock strip within the slot in the peripheral gasket acts to effect a securing grip on the transparent armor pane in the transparent armor assembly and removal of the lock strip from the peripheral strip acts to free the securing grip on the transparent armor pane for removal thereof from the transparent armor assembly to define the egress portal.

5. The vehicle emergency egress assembly of claim 1 wherein the at least one rotary locking mechanism includes a cam that engages the plate on the inward directed face of the vehicle window frame.

* * * * *